US006445574B1

(12) United States Patent
Saw et al.

(10) Patent No.: US 6,445,574 B1
(45) Date of Patent: Sep. 3, 2002

(54) ELECTRONIC DEVICE

(75) Inventors: Benson Saw, Island Park; Chin Chuan Lim, Prai; Seong Jin Lim; Tee Hoh Quah, both of Penang, all of (MY)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/698,548

(22) Filed: Oct. 30, 2000

(51) Int. Cl.[7] ................................................. G06F 1/16
(52) U.S. Cl. ........................ 361/681; 361/679; 361/681; 361/683; 361/686; 345/1; 349/58; 359/83
(58) Field of Search .................................. 361/679, 681, 361/683, 686; 345/1, 901, 903, 905; 349/58, 73; 359/83

(56) References Cited

U.S. PATENT DOCUMENTS 5,570,267 A * 10/1996 Ma ............................. 361/681
D408,030 S     4/1999  Richards et al. ........... D14/138
6,262,785 B1 *  7/2001  Kim ............................. 349/58

* cited by examiner

Primary Examiner—Darren Schuberg
Assistant Examiner—Yean-Hsi Chang
(74) Attorney, Agent, or Firm—Frank M. Scutch, III

(57) ABSTRACT

An electronic device such as a mobile telephone and including a main body (10) having a display panel (16); a cover (12) pivotally attached to the main body. The cover is moveable between a first position where the cover (12) overlies the display panel (16), and a second position to allow access to the display panel (16) by a user. An aperture (28) is created in the cover (12) in which is located a second display panel (30).

11 Claims, 3 Drawing Sheets

ELECTRONIC DEVICE

FIELD OF THE INVENTION

This invention relates to a display for an electronic device and refers particularly, though not exclusively, to an electronic device with a pivotal cover and a display panel.

BACKGROUND OF THE INVENTION

Portable communication devices such as mobile telephones, two way radios and similar electronic devices, particularly hand held electronic devices, typically have a display panel on which information can be displayed. To enable smaller such devices, particularly mobile telephones, a cover pivotally attached to the main portion of the device is used to allow a reasonable distance between the microphone and speaker. The cover is pivotally moveable between an extended or in use position, and a closed, or inoperative position.

The cover of some electronic devices will be over the keypad when in the closed position to protect the keypad and thus eliminate accidental operation. In some instances, the display panel of the device is not covered by the cover when in the closed position. However, particularly for quite small devices such as, for example, mobile telephones, the cover may extend over the display panel when in the closed position. This will prevent a user from being able to see the display when the cover is closed. With mobile messaging, paging, and the extension of WAP to mobile telephony, this may create a problem for a user in that they have to move the cover to the open position before being able to view the display.

Recent improvements to electronic devices include providing a transparent window on the cover to allow viewing of the display panel when the cover is in the closed position. Although useful, this window does not provide any significant benefits when the cover is in the open position.

SUMMARY OF THE INVENTION

According to one aspect of the invention there is provided an electronic device a main body with an associated first display panel; a cover pivotally attached to the main body and moveable between a closed position wherein the cover overlies the main body, and an open position where the cover extends outwardly from the main body; and a second display panel mounted in the cover and viewable by the user when the cover is in the open position.

Preferably, the second display panel may be at least as large as the first display panel, but it may be substantially the same size and shape as the first display panel. The second display panel may be preferably substantially transparent when the cover is in the closed position.

The second display panel can be preferably mounted in an aperture in the cover. There may also be a first transparent lens mounted in the aperture generally parallel to and adjacent the second display panel, the first transparent lens being substantially coplanar with an outer surface of the cover. There may be a second lens mounted in the aperture generally parallel to and adjacent the second display panel, the second transparent lens being substantially coplanar with an inner surface of the cover.

Therefore, the second display panel may be between the first and second transparent lenses such that the second display panel, and the first and second transparent lenses, form a window.

The aperture, and hence, the window can be preferably substantially aligned with the display panel when the cover is in the first position. If desired, the second display panel may not be able to operate when the cover is in the first position, and can only operate when the cover is in the second position.

DESCRIPTION OF THE DRAWINGS

In order that the present invention may be readily understood and put into practical effect, there shall now be described by way of non-limitation example only a preferred embodiment of the present invention, the description being with reference to the accompanying illustrative drawings in which.

DESCRIPTION OF A PREFERRED EMBODIMENT

Figure 1:
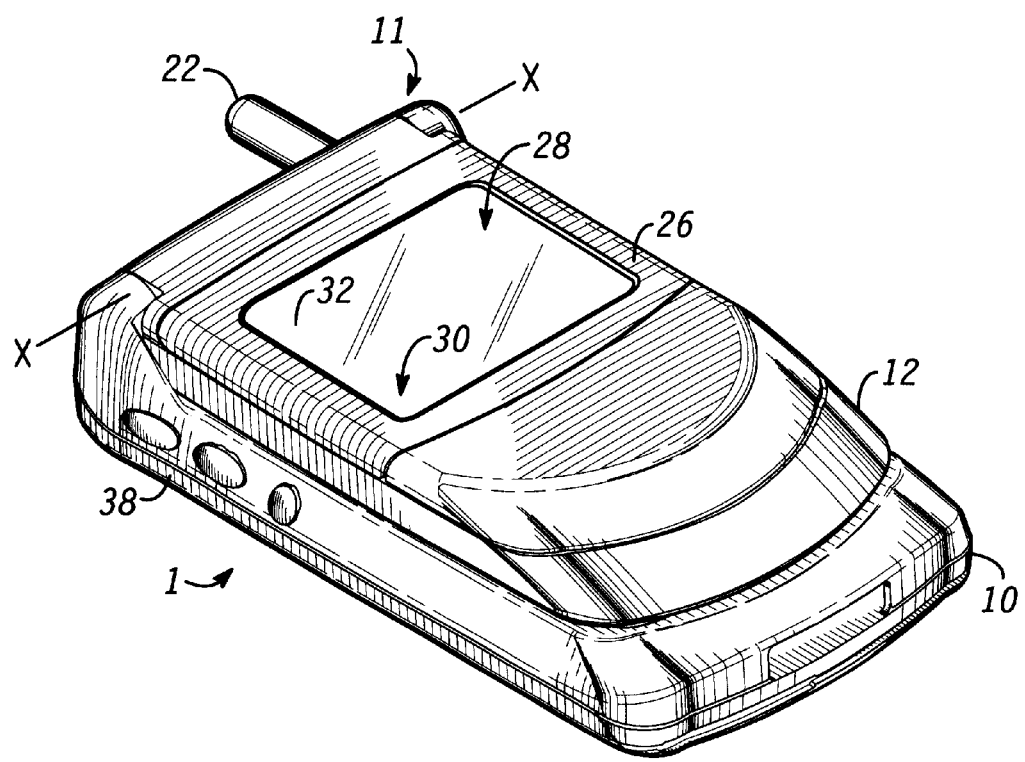
FIG. 1 is a perspective view of an electronic device in a closed position in accordance with the invention.
Figure 2:
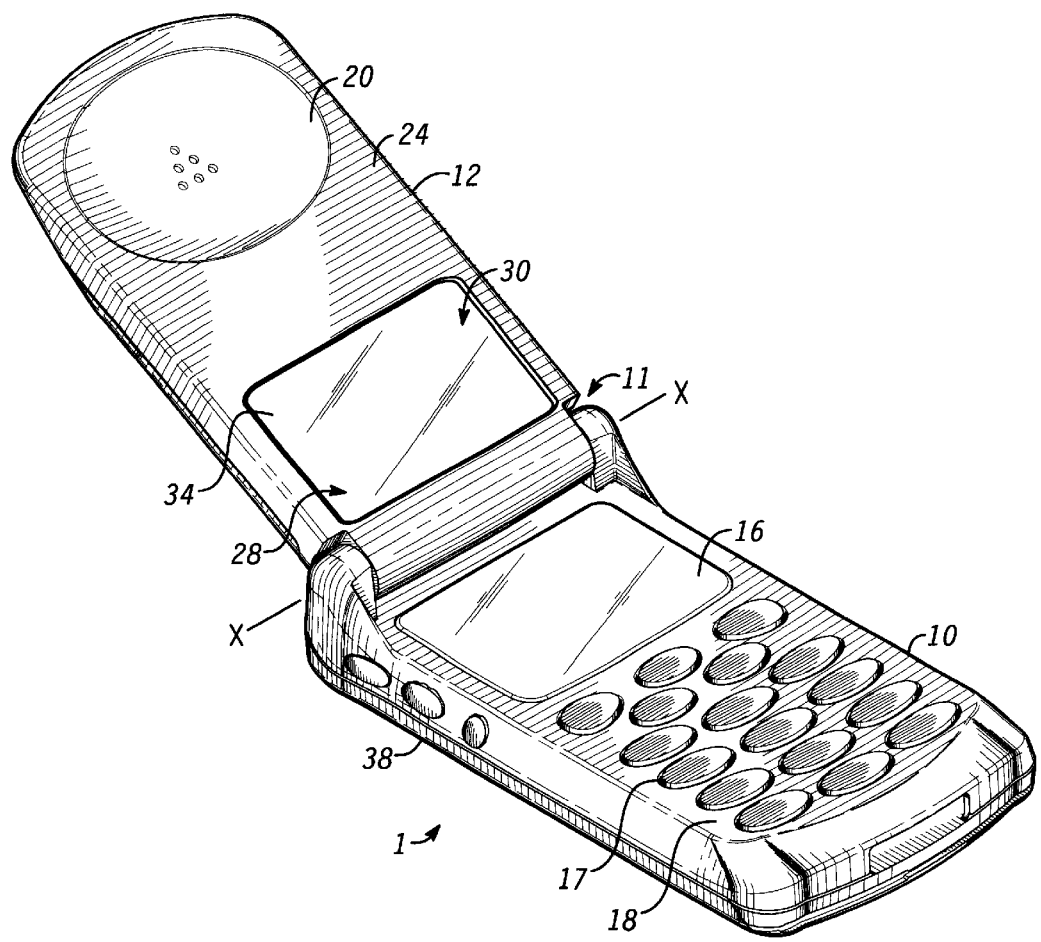
FIG. 2 is a perspective view of the electronic device of FIG. 1 when in an open position.
Figure 3:
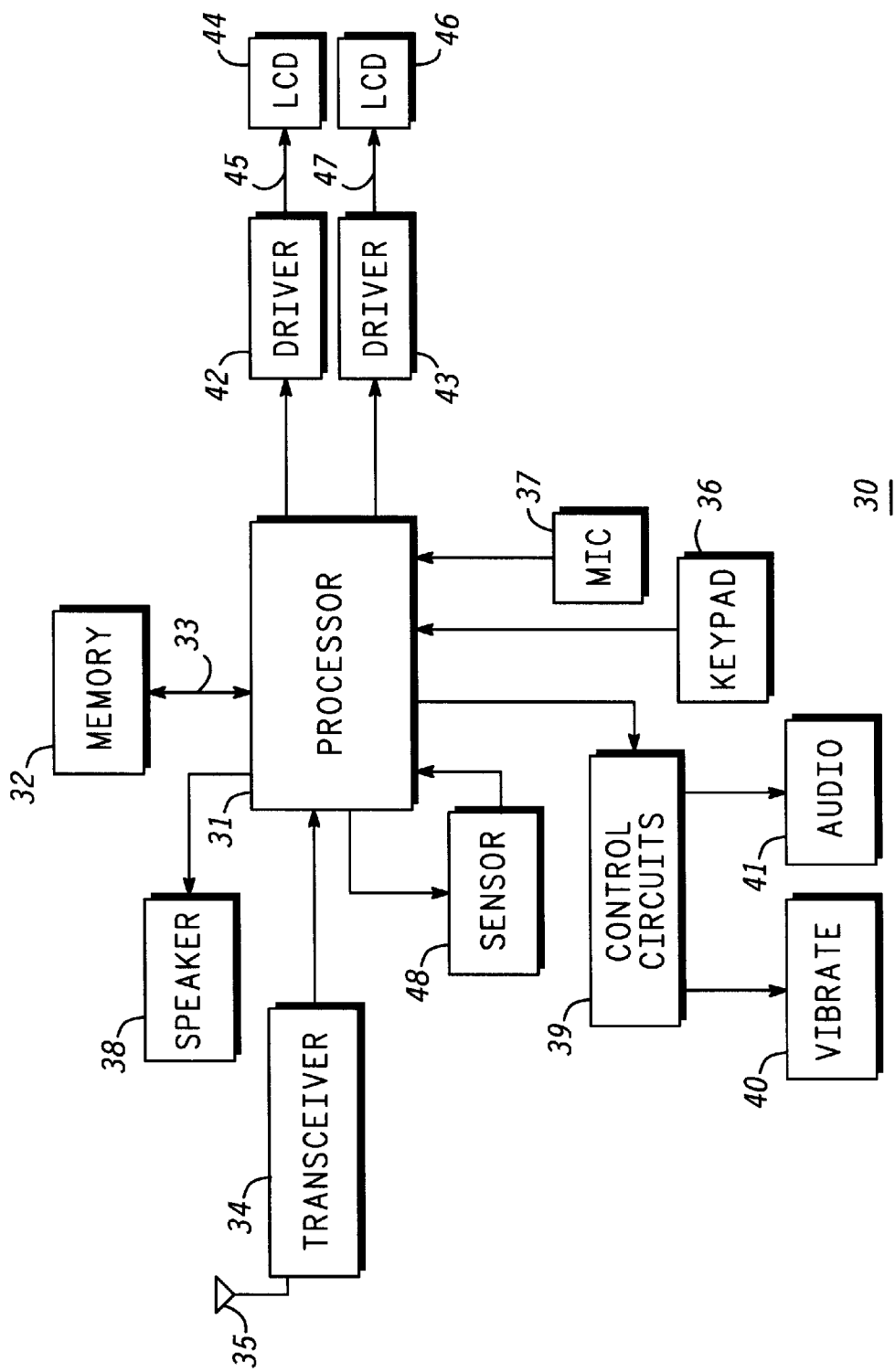
FIG. 3 is a schematic block diagram of electronic circuitry of the electronic device of FIG. 1.

Referring to FIGS. 1 to 3 there is illustrated an electronic device 1 in the form of a mobile telephone. The electronic device 1 has a main body 10 and a cover 12 pivotally attached to the main body 10 by a pivotal assembly 11. Accordingly, the cover 12 is moveable relative to the main body 10, about a pivotal axis X, between a first or closed position shown in FIG. 1 where it overlies the main body 10, to a second or open position shown in FIG. 2 where it extends outwardly from the main body 10. When in the first or closed position, the cover 12 overlies the main body 10 to an extent that it covers keypad keys 17 on the main body 10.

The body 10 has an associated first display panel 16 being of known construction and typically includes a liquid crystal display. Mounted behind a microphone aperture 18 in main body 10 is a microphone or other sound detecting apparatus. Mounted behind a speaker outlet region 20 of cover 12 is a speaker or other sound reproducing apparatus. An antenna 22 is provided of known construction. There is also a battery pack 38 mounted to the main body 10, the battery pack providing electrical power to the device 1. As shown, the cover 12 extend over the display panel 16 when in the first or closed position. The cover 12 has an inner surface 24 and an outer surface 26. An aperture 28 is provided in cover 12 and which extends between surfaces 24 and 26. Aperture 28 is at least as large as display panel 16. Typically, aperture 28 is substantially the same size and shape as display panel 16. When cover 12 is in the closed position, aperture 28 is aligned with display panel 16 so that all of display panel 16 can be viewed through aperture 28.

Mounted in aperture 28 is a second display panel 30 which is substantially the same size and shape as the first display panel 16. When cover 12 is in the first or closed position, second display panel 30 is configured to be substantially transparent. This allows the first display panel 16 to be viewed through aperture 28. The second display panel 30 is of known construction and typically includes a liquid crystal display of a type typically found in ornamental clocks, some type of watches and some car radios displays. This liquid crystal display does not have a reflector or transflector and is generally known in the art as a transmissive liquid crystal display which have transmissive polarizers on both faces.

A first transparent lens 32 is mounted in aperture 28 parallel to and adjacent second display panel 30, with first lens 32 being generally coplanar with the outer surface 26. A second transparent lens 34 may be provided mounted in aperture 28 parallel to and adjacent second display panel 30, with second transparent lens 34 being generally coplanar with the inner surface 24. In this way, second display panel 30 is located between first and second transparent lenses 32, 34, and may be sandwiched between them. The first and second transparent lenses 32, 34, and second display panel 30, form a window in aperture 28.

In this way, when the cover 12 is in the first or closed position of FIG. 1, the display panel 16 will be viewable through aperture 28 and the window therein. When the cover 12 is moved to the second or open position of FIG. 2, second display panel 30 can operate so that a user can view what is being displayed on either or both display panels 16, 30. If desired, second display panel 30 may be operable only when in the second or open position of FIG. 2, and will be inoperable when in the first or closed position of FIG. 1. However, the second display panel 30 may be operable when the cover 12 is in any position relative to body 10, if desired.

Referring to FIG. 3, electronic circuitry 30 of the electronic device 1 is illustrated. The circuitry 30 comprises a processor 31 and associated buffering circuitry, a memory 32 comprising both Random Access Memory and Read Only Memory operatively coupled to processor 31 by a bus 33. Also operatively coupled to processor 31 is a transceiver 34 with an associated antenna 35. An alpha-numeric keypad 36 actuateable by keypad keys 17, a microphone 37 for speech input, a speaker 38, alert control driving circuitry 39 with an associated vibration transducer 40 and audio alert transducer 41. The electronic circuitry 30 also has a first row and column liquid crystal display driving circuitry 42 and a second row and column liquid crystal display driving circuitry 43 both operatively coupled to processor 31. The first row and column liquid crystal display driving circuitry 42 is coupled, by driver lines 45, to a liquid crystal display 44 of first display panel 16. Similarly, the second row and column liquid crystal display driving circuitry 43 is coupled, by driver lines 47, to a liquid crystal display 46 of second display panel 30. A sensor 48, typically an electromagnetic relay or cam actuated switch, is coupled to processor 31.

In use, sensor 48 provides a signal to processor 31, this signal being indicative of the cover 12 being in the open or closed position. Accordingly, when cover 12 is in the closed position, liquid crystal display 46 is substantially transparent and when cover 12 is in the open position, liquid crystal display 46 displays indicia for a user to view. As will be apparent to a person skilled in the art, when cover 12 is in an open position, the indicia displayed differs from indicia displayed on liquid crystal display 44.

Whilst there has been described in the foregoing description a preferred embodiment of the present invention, it will be understood by those skilled in the technology that many variations or modifications in details of design or construction may be made without departing from the present invention.

What is claimed is:

1. An electronic device including:

a main body with an associated first display panel;

a cover pivotally attached to the main body and moveable between a closed position wherein the cover overlies the main body, and an open position where the cover extends outwardly from the main body; and a second display panel mounted in an aperture in the cover and viewable by the user when the cover is in the open position, wherein the second display panel is substantially transparent when the cover is in the closed position and the aperture is substantially aligned with the first display panel when the cover is in the closed position to enable a user to view the first display panel.

2. An electronic device as claimed in claim 1, wherein the second display panel is at least as large as the first display panel.

3. An electronic device as claimed in claim 2, wherein the second display panel is of substantially the same size and shape as the first display panel.

4. An electronic device as claimed in claim 3, wherein the cover has an inner surface and an outer surface, the aperture extending between and connecting the outer and inner surfaces.

5. An electronic device as claimed in claim 4, wherein there is a first transparent lens mounted generally parallel to and adjacent the second display panel and being substantially coplanar with the outer surface.

6. An electronic device as claimed in claim 5, wherein there is a second lens mounted generally parallel to and adjacent the second display panel, the second transparent lens being substantially coplanar with the inner surface.

7. An electronic device as claimed in claim 6, wherein the second display panel is between the first and second transparent lenses.

8. An electronic device as claimed in claim 7, wherein the second display panel, and the first and second transparent lenses, form a window.

9. An electronic device as claimed in claim 1, wherein when the cover is in the open position, the second display panel displays indicia for a user to view.

10. An electronic device as claimed in claim 9, wherein when the cover is in the open position, the indicia displayed on the second display panel differs from at least some indicia displayed on the first display panel.

11. An electronic device as claimed in claim 9, wherein, the first and second display panels include liquid crystal displays.

* * * * *